(12) United States Patent
Chen et al.

(10) Patent No.: US 10,262,460 B2
(45) Date of Patent: Apr. 16, 2019

(54) THREE DIMENSIONAL PANORAMA IMAGE GENERATION SYSTEMS AND METHODS

(71) Applicant: Honeywell International Inc., Morristown, NJ (US)

(72) Inventors: Henry Chen, Beijing (CN); Jian Geng Du, Beijing (CN); Yan Xia, Beijing (CN); Liana M. Kiff, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 8 days.

(21) Appl. No.: 14/022,737

(22) Filed: Sep. 10, 2013

(65) Prior Publication Data
US 2014/0152651 A1 Jun. 5, 2014

Related U.S. Application Data

(60) Provisional application No. 61/731,884, filed on Nov. 30, 2012.

(51) Int. Cl.
*G06T 19/00* (2011.01)

(52) U.S. Cl.
CPC ........ *G06T 19/003* (2013.01); *G06T 2210/04* (2013.01)

(58) Field of Classification Search
CPC ......... G06T 15/00; G06T 15/10; G06T 17/00; G06T 17/20; G06T 19/00; G06T 15/01; H04N 1/2112; H04N 5/765; H04N 5/77; H04N 5/772; H04N 7/18; H04N 7/181; H04N 7/183; H04N 7/188; H04N 17/06; G08B 13/19645; G08B 13/19656; G01B 11/002

USPC ............... 348/139, 143; 386/223, 224, 226; 345/419

See application file for complete search history.

(56) References Cited

U.S. PATENT DOCUMENTS

| | | | | |
|---|---|---|---|---|
| 5,923,331 A | * | 7/1999 | Dusseux ................. | G06T 15/40 345/421 |
| 6,111,582 A | * | 8/2000 | Jenkins ................... | G06T 15/20 345/421 |
| 6,486,908 B1 | * | 11/2002 | Chen ..................... | G06T 3/0018 345/441 |
| 7,292,261 B1 | * | 11/2007 | Teo ................................. | 348/36 |
| 8,705,892 B2 | * | 4/2014 | Aguilera et al. .............. | 382/285 |

(Continued)

OTHER PUBLICATIONS

Artur Krukowski, et al. Comprehensive Building Information Management System Approach. International Journal of Simulation Systems, Science & Technology, vol. 11, No. 3, pp. 12-28, May 2010.

(Continued)

*Primary Examiner* — Sae Won Yoon
(74) *Attorney, Agent, or Firm* — Honeywell International Inc.

(57) ABSTRACT

Three dimensional (3D) operational user interface generation systems and methods are described herein. For example, one or more embodiments include calculating a number of locations for a virtual camera, placing the virtual camera at each of the number of locations, generating a 3D image at each of the number of locations, implementing object information for each pixel of the 3D image, and generating a 3D user interface utilizing the 3D image at each of the number of locations.

16 Claims, 4 Drawing Sheets

(56) References Cited

U.S. PATENT DOCUMENTS

| | | | | |
|---|---|---|---|---|
| 9,019,269 B1* | 4/2015 | Pogue | | G06T 15/506 345/419 |
| 2001/0043219 A1* | 11/2001 | Robotham | | G06T 7/0022 345/474 |
| 2004/0169724 A1* | 9/2004 | Ekpar | | 348/36 |
| 2007/0171049 A1* | 7/2007 | Argasinski | | 340/539.13 |
| 2007/0183685 A1* | 8/2007 | Wada | | G06K 9/32 382/285 |
| 2007/0219645 A1* | 9/2007 | Thomas et al. | | 700/29 |
| 2007/0285424 A1* | 12/2007 | Cheng | | G06T 19/00 345/427 |
| 2008/0049012 A1* | 2/2008 | Bar-Joseph | | G06T 19/00 345/419 |
| 2008/0062167 A1* | 3/2008 | Boggs et al. | | 345/419 |
| 2008/0074500 A1* | 3/2008 | Chen et al. | | 348/207.1 |
| 2008/0291279 A1* | 11/2008 | Samarasekera | | G08B 13/19693 348/159 |
| 2009/0096790 A1* | 4/2009 | Wiedemann et al. | | 345/427 |
| 2009/0290848 A1* | 11/2009 | Brown | | H04N 5/232 386/223 |
| 2009/0307255 A1 | 12/2009 | Park | | |
| 2010/0033551 A1* | 2/2010 | Agarwala | | G06T 3/0018 348/36 |
| 2010/0094714 A1* | 4/2010 | Varon | | G06Q 30/0276 705/14.72 |
| 2010/0110071 A1* | 5/2010 | Elsberg | | G06T 15/005 345/419 |
| 2010/0138762 A1* | 6/2010 | Reghetti | | G06T 19/20 715/765 |
| 2010/0156906 A1* | 6/2010 | Montgomery et al. | | 345/427 |
| 2010/0165101 A1* | 7/2010 | Kludas et al. | | 348/135 |
| 2010/0223032 A1* | 9/2010 | Reghetti et al. | | 703/1 |
| 2010/0253676 A1* | 10/2010 | Mumbauer | | G06T 15/20 345/419 |
| 2010/0289817 A1* | 11/2010 | Meier | | G06T 15/20 345/619 |
| 2011/0115816 A1* | 5/2011 | Brackney | | G06Q 10/06 345/629 |
| 2011/0252367 A1* | 10/2011 | Nakamura | | G06T 19/00 715/810 |
| 2012/0119879 A1* | 5/2012 | Estes | | G08B 13/19641 340/8.1 |
| 2012/0127170 A1* | 5/2012 | Varadhan | | G06T 19/00 345/419 |
| 2012/0223936 A1* | 9/2012 | Aughey | | G06F 3/04815 345/419 |
| 2012/0259594 A1* | 10/2012 | Khan | | G06T 13/60 703/1 |
| 2012/0296610 A1* | 11/2012 | Hailemariam et al. | | 703/1 |
| 2012/0299920 A1* | 11/2012 | Coombe et al. | | 345/423 |
| 2012/0317506 A1* | 12/2012 | Zhao et al. | | 715/764 |
| 2013/0009950 A1* | 1/2013 | Ben-David | | G06T 17/05 345/419 |
| 2013/0085588 A1 | 4/2013 | Brun et al. | | |
| 2013/0096873 A1* | 4/2013 | Rosengaus | | G01C 15/002 702/151 |
| 2013/0155058 A1* | 6/2013 | Golparvar-Fard | | G06T 19/006 345/419 |
| 2013/0300740 A1* | 11/2013 | Snyder | | G06F 3/016 345/420 |
| 2014/0098234 A1* | 4/2014 | Ho | | G08B 13/19695 348/152 |
| 2014/0192159 A1* | 7/2014 | Chen | | G06T 15/20 348/46 |
| 2014/0218360 A1* | 8/2014 | Dalgaard Larsen | | G06F 17/30 345/420 |
| 2015/0154786 A1* | 6/2015 | Furukawa | | H04N 7/181 345/419 |
| 2015/0254694 A1* | 9/2015 | Filip | | G06Q 30/0207 705/14.1 |

OTHER PUBLICATIONS

Andreas Fernbach, et al. Interoperability at the Management Level of Building Automation Systems: A Case Study for BACnet and OPC UA, IEEE ETFA. pp. 1-8. 2011.

* cited by examiner

//  THREE DIMENSIONAL PANORAMA IMAGE GENERATION SYSTEMS AND METHODS

TECHNICAL FIELD

The present disclosure relates to three dimensional operational user interface generation systems and methods.

BACKGROUND

Building information modeling (BIM) can refer to the generation and/or management of data associated with a building (e.g., data associated with the components, equipment, and/or properties of a building). For example, BIM data can include architectural, mechanical, electrical, plumbing, sanitary, fire, and/or geometrical information associated with a building.

The leading international standard for describing the data contained within a building information model is called the Industry Foundation Classes (IFC), which is an open standard designed and maintained by the Building Smart Alliance. This is a very comprehensive standard that provides for the description of data related to many sub-domains related to the design, build, construction, and/or operation of a built environment (e.g., building).

The amount of BIM data associated with a building, and codified or expressed in the IFC standard, tends to be proportional to the size of the building, and can grow exponentially based on the number of specific sub-domains that are identified and documented in the BIM, including, for example, plumbing, electrical, or HVAC systems. Therefore, even a small building with very complete information for many different systems within the building may have a very large amount of BIM data associated therewith.

DETAILED DESCRIPTION

Figure 1:
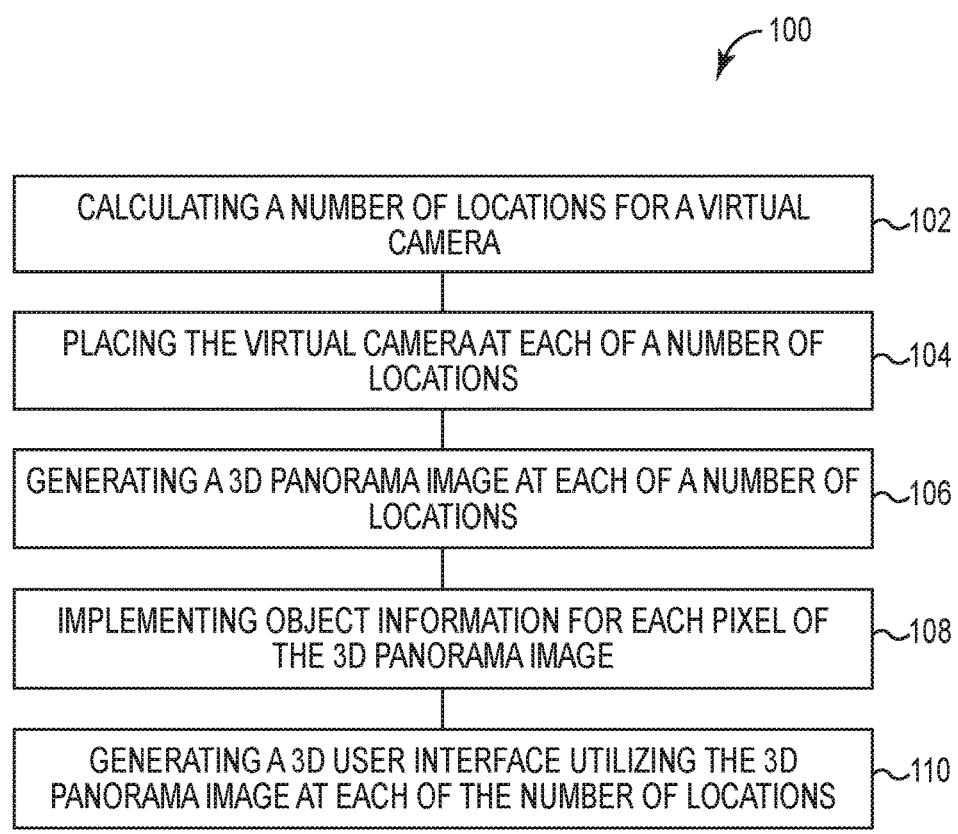
FIG. 1 illustrates an example method for three dimensional operational user interface generation in accordance with one or more embodiments of the present disclosure.

Three dimensional (3D) operational user interface generation systems and methods are described herein. For example, one or more embodiments include calculating a number of locations for a virtual camera, placing the virtual camera at each of the number of locations, generating a 3D image at each of the number of locations, implementing object information for each pixel of the 3D image, and generating a 3D user interface utilizing the 3D image at each of the number of locations.

3D image generation can include calculating a number of locations within a building for placing a number of virtual cameras. The number of virtual cameras can be used to capture a number of objects within the surrounding area of the corresponding calculated location. Capturing the number of objects within the surrounding area can include generating a number of 3D images for each surrounding area of the calculated location. The number of 3D images can be implemented with real object information of the building for each pixel within each of the number of 3D images. The number of 3D images can include a number of 3D panorama images. The number of 3D panorama images can be generated by panning and/or tilting the virtual camera at each location to capture images from different shooting angles of the locations. The panning and/or tilting can capture each of the number of locations three hundred and sixty degrees (360°) around the location of the virtual camera.

The number of 3D images with the implemented object information can be used to generate a 3D user interface of the building. The 3D user interface can be used to display and navigate (e.g., move from a first location to a second location, etc.) the number of 3D images and/or 3D panorama images of the building. The 3D user interface can be used to select pixels within the 3D user interface to display an object and object information that a corresponding pixel represents.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of locations" can refer to one or more locations.

FIG. 1 illustrates an example method 100 for three dimensional (3D) image generation in accordance with one or more embodiments of the present disclosure. The method 100 can be used to capture a number of objects within a particular location to generate a 3D image of the particular location and/or a 3D panorama image of the particular location. The 3D image and/or a 3D panorama image can be used to generate a 3D user interface for the particular location and/or for a building that is represented by BIM data.

At block 102, method 100 includes calculating a number of locations for a virtual camera. Calculating the number of locations can include using BIM data to determine a size of a particular location and/or a number of occlusions within the particular location. For example, the size of the location can be a measurement of the particular location (e.g., square feet, measured size, area, etc.). In another example, a particular location can include a number of occlusions (e.g., walls, pillars, stair cases, objects, etc.) that can restrict a view of objects (e.g., devices, heating, ventilation, and air conditioning (HVAC) equipment, computer systems, etc.) within a 3D image. The number of occlusions can restrict the view of other objects within the particular location. For example, a staircase can block an object behind the staircase. In an additional example, ceiling tiles of a room can block devices of an HVAC system.

The size of the particular location and/or the number of occlusions within the particular location can be used to calculate the number of locations to place the number of virtual cameras to capture objects within a particular location. For example, a particular location can be in a relatively small room with few or no occlusions that restrict a view of other objects within the room. In this example, the virtual camera can be placed at the center of the small room and capture objects within the small room and generate a 3D image of the small room. In another example, a number of occlusions within a particular room can restrict a view of objects within the 3D image if only a single virtual camera is used. In this example, more than one virtual camera can be placed within the particular room to capture the objects restricted by the occlusions.

At block 104, method 100 includes placing the virtual camera at each of the number of locations. The number of locations can include a coordinate location from the BIM data. For example, the BIM data can include coordinate locations for each object within a building. The virtual camera can capture information surrounding the coordinate location. For example, the virtual camera can be placed at a coordinate location that is at a center of a particular room within a building. In this example, the virtual camera can capture objects surrounding the center of the particular room. As described herein, the location can be determined based on the size of the location and/or a number of occlusions within the location.

At block 106, method 100 includes generating a 3D image at each of the number of locations. The virtual camera at each of the number of locations can be used to capture objects of the number of locations. For example, the virtual camera can capture a number of objects, occlusions, and spatial area of the number of locations.

Capturing objects surrounding the virtual camera can include taking a number of photos surrounding the virtual camera. The number of photos can be a visual representation of a number of objects based on BIM data. The visual representation can be similar to an actual photo. For example, the virtual camera can include a focal point and other limitations similar to a photographic camera to capture objects similar to a photographic camera.

Each of the number of photos surrounding the virtual camera can be used to generate a 3D image and/or 3D panorama image of the surrounding area of the virtual camera. For example, a number of photos can be captured to generate a sphere panorama surrounding the virtual camera. Panning and tilting angles can be used to take photos of the surrounding location to generate photos of a sphere surrounding the virtual camera. In one example, a number of tilt angles (e.g., 0 degrees, 22.5 degrees, 45 degrees, 67.5 degrees, 90 degrees, 112.5 degrees, 135 degrees, and 157.5 degrees using eight tilt angles) can be used, wherein the virtual camera can pan in a circle (e.g., 360 degrees, etc.) at each of the number of number of tilt angles.

Figure 2:
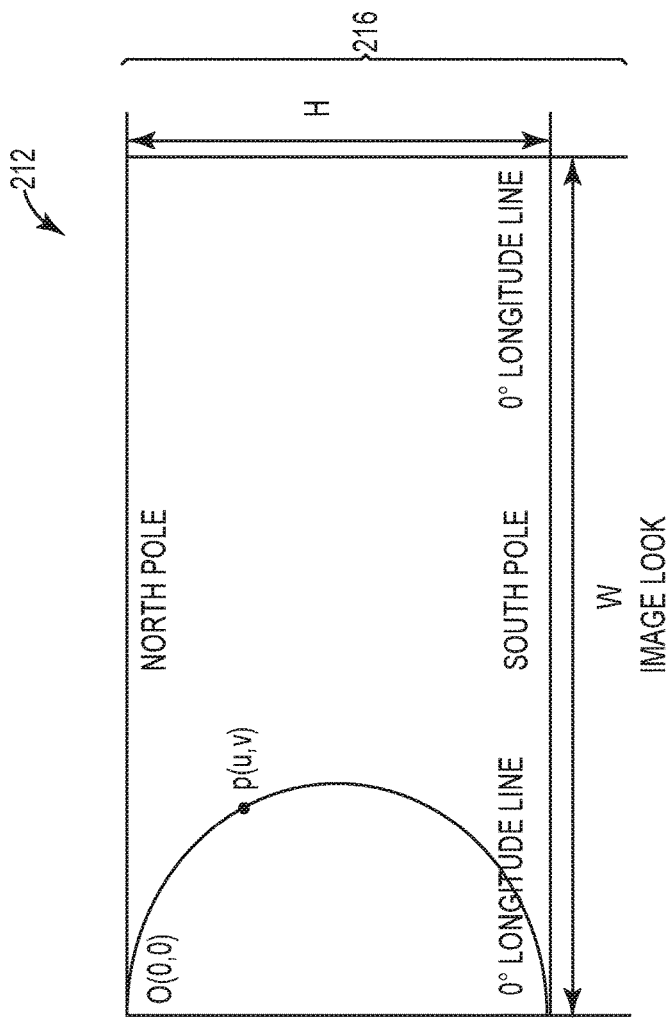
FIG. 2 illustrates an example of a coordinate transformation in accordance with one or more embodiments of the present disclosure.
Figure 2:
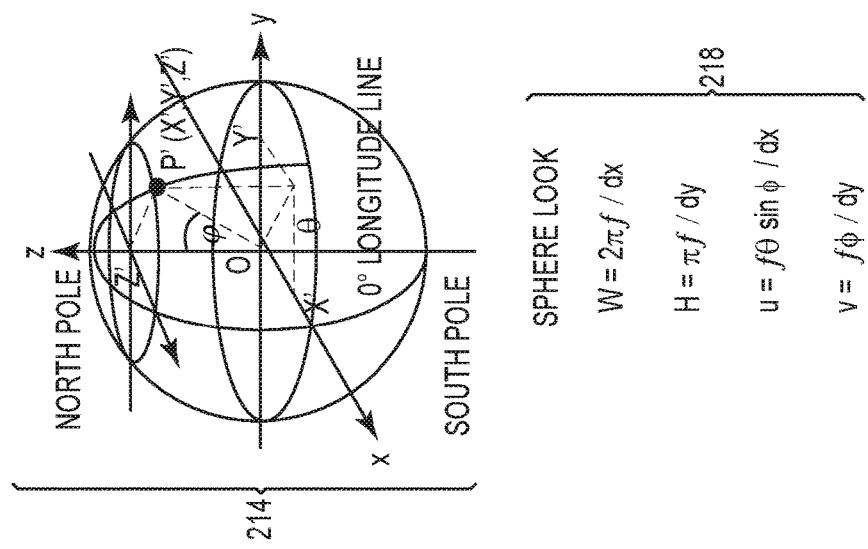

Capturing objects within the BIM data that is surrounding the virtual camera can be calculated using a transformation. The transformation can utilize a world coordinate system (e.g., coordinate system that describes objects within a building, etc.) from the BIM data. An example transformation is shown in FIG. 2. The transformation can include using a sphere panorama, wherein the radius of the sphere can be represented by (f) (e.g., focal length of the virtual camera, etc.). The transformation can include a number of world coordinates (e.g., coordinates from the world coordinate system, etc.). For example, world coordinates can include coordinates of an object (P) being (X, Y, Z). The world coordinates can be transformed to coordinates placed on the surface of the sphere. For example, coordinates (X, Y, Z) from the world coordinates can be transformed to coordinates (X', Y', Z') on the surface of the sphere.

The coordinates on the surface of the sphere can be transformed to a image coordinate. Transforming the coordinates on the surface of the sphere to the image coordinate can be used to generate the 3D image at each of the number of locations from the sphere. For example, FIG. 2 shows that an object (P') can have coordinates (X', Y', Z') on the surface of the sphere and that object (P') can be transformed to object (p) having coordinates (u, v).

Objects near the north pole of the sphere can translated to the top border of the image. In addition, objects near the south pole of the sphere can be translated to the bottom border of the image. For example, objects with a sphere coordinates that are closer to the north pole of the sphere would appear closer to the top border of the image compared to objects with a sphere coordinates that are closer to the south pole of the sphere.

A longitude line can be determined for the sphere (e.g., line at 0 degrees, etc.). The longitude line can be used to determine how close an object can appear to the left or right border of the image. For example, a center point on the longitude line of 180° can represent the center of the image and based on the point objects to the left can appear closer to the left image border and objects to the right can appear closer to the right image border.

The 3D image can be generated based on the coordinate information from the BIM data and transforming the coordinate information for the sphere coordinates around each of the virtual cameras.

The 3D image can be generated based on a defined rule (e.g., predefined rule, etc.). The rule can identify a number of objects that are desired to be viewed by a user. For example, the rule can identify an HVAC system and/or a portion of the HVAC system. In this example, the 3D image that is generated can remove occlusions and/or objects that would otherwise obstruct a view of the HVAC system. For example, portions of the roof within a room can be removed from the 3D image to display portions of the HVAC system behind the roof. In an additional example, the rule can identify particular objects within a room such as a machine room. The machine room can include various devices (e.g., computing devices, etc.). In this example, the rule can define particular devices within the machine and remove other devices that can obstruct the view of the defined particular devices.

The defined rule can also include a "best view" option. The "best view" option can be selected with a number of objects. The "best view" option can generate a 3D image that provides a view that highlights the selected number of objects. For example, the view that highlights the selected number of objects can include a particular angle that is directed towards the selected number of objects. In addition, the "best view" option can include a particular zoom level to highlight the number of objects and/or a portion of the number of objects. For example, the "best view" option can zoom in the selected number of objects to show functionality of the selected number of objects. The "best view" option can include a plurality of defined rule combinations to highlight the number of selected objects. For example, the "best view" option can include a particular zoom, a removal of a number of occlusions, and/or a particular angle or view.

At block 108, method 100 includes implementing object information for each pixel of the 3D image. In one embodiment, the method 100 can include implementing object information for each area of pixels (e.g., a number of pixels that make up an image of the object, etc.) of the 3D image that stands for the object. The object information for a pixel and/or each area of the 3D image can be implemented into each pixel and/or area of pixels using the BIM data and including the object information that corresponds to the coordinates of the pixel and/or area of pixels. For example, a particular pixel and/or area of pixels can correspond to a security camera of the building within the BIM data.

The pixel and/or area of pixels that corresponds to the object can include various information relating to the object information (e.g., object identification number, serial number for a real object represented by the pixel, Building Automation System (BAS) information, etc.). For example, the object information can include BAS (e.g., security system, computer system, building management system (BMS), etc.) information such as a security camera and the information relating to the security camera.

The BAS information for the security camera can include, but is not limited to: the type of camera, an object identification number assigned to the security camera, and/or coordinate information for the security camera. In this same example, the information can include real-time status information from the camera (e.g., live video feed, status, etc.). Information relating to object information can include, but is not limited to, various features of the object (e.g., software information, zoom capabilities, power consumption, etc.), history information of the object (e.g., previous updates, previous maintenance, date of installation, etc.), analytics of the object (e.g., power consumption, time of use, etc.), and/or real-time data for the particular object information. For example, a particular pixel corresponding to a part of an HVAC system can include temperature readings, specifications, maintenance history, among other features of the HVAC system.

The object information can be displayed to a user upon selecting a pixel and/or area of pixels corresponding to the object within the 3D image. The displayed object information can be altered and/or updated by a user. For example, the BAS information that is displayed within the object information can be changed and/or updated by a user. In another example, the displayed object information for a security camera can be updated by changing an object identification number.

At block 110, method 100 includes generating a 3D user interface utilizing the 3D image at each of the number of locations. The 3D user interface can be generated by utilizing the 3D images and/or the 3D panorama images from each of the number of locations with the virtual camera. The 3D user interface can enable a user to navigate through a 3D visual representation of the building. For example, a user can control the 3D user interface to view each of the number of locations captured by the virtual cameras. In this example, each 3D image can be used in the 3D user interface to enable the user to navigate through each of the number of locations.

The 3D user interface can also enable the user to select objects and retrieve information from each pixel and/or area of pixels within a 3D visual representation of the building. For example, the 3D user interface can display a variable air volume (VAV) box from an HVAC system. In this example, the VAV box can be selected and the 3D user interface can display a number of features and/or real-time data of the VAV box.

Generating a 3D user interface using the 3D images can utilize lower system requirements compared to generating a 3D model of the BIM data (e.g., virtual reality environment, etc.). In addition, the 3D user interface as described herein can provide a simpler interaction and navigation for the user compared to generating a 3D model of the BIM data.

FIG. 2 illustrates an example of a coordinate transformation 212 in accordance with one or more embodiments of the present disclosure. The coordinate transformation 212 can include a first transformation from a world coordinate system 214 within the BIM data to a surface sphere 214 coordinate of an image 216. For example, the world coordinate for an object (P) within the BIM data can be (X, Y, Z). In this example, the world coordinate for the object (P) can be transformed to the surface sphere coordinate of (X', Y', Z') as an object (P'). The surface sphere coordinate can be a coordinate on the surface of a sphere 214 surrounding a virtual camera.

The coordinate transformation can also include a second transformation from the surface sphere coordinate to an image coordinate. For example, the surface sphere coordinate for the object (P') of (X', Y', Z') can be transformed to an image coordinate of (u, v) for an object (p).

The second transformation can include a determination of a location of the object (p) on the image 216. The determination of the location of the object (p) can include determining a height of the 3D image (H). For example, it can be determined whether the object (p) is closer to the top border of the image 216 and/or closer to the bottom border of the based on a relative surface sphere coordinate location to the north pole and/or south pole of the sphere 214. For example, the object (P') can have a surface sphere coordinate location near the north pole of the sphere 214 and can be transformed to the top border of the image 216.

The determination of the location of the object (p) on the image 216 can include determining a width of the 3D image (W). For example, it can be determined whether the object (p) is closer to the right border of the image 216 and/or the left border of the image 216. A longitude line can be used to determine if the object (p) is closer to the right border of the image 216 and/or the left border of the image 216. The longitude line can indicate a relative location compared to the right border of the image 216 and/or the left border of the image 216.

FIG. 2 shows a number of equations 218 that relate to the sphere 214. The equations 218 can be examples of how to calculate a width (W) and/or height (H) of the 3D image. The equations can also be examples of how to calculate the image 216 coordinate values u and v.

Figure 3:
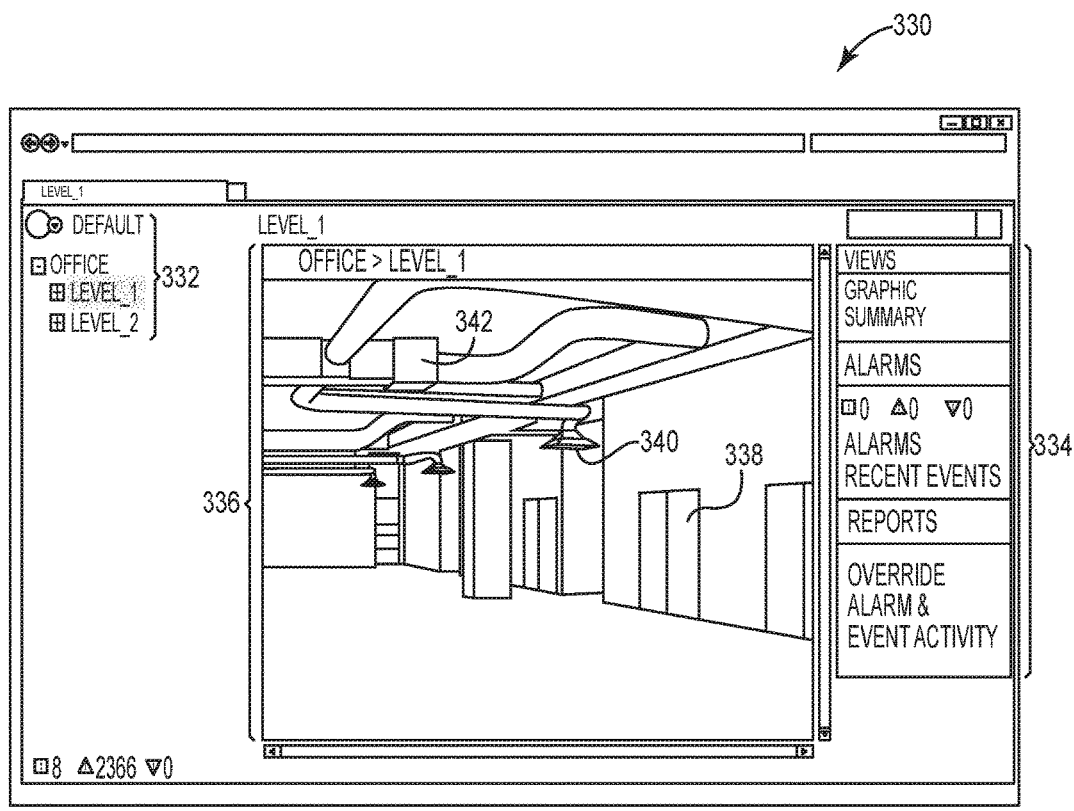
FIG. 3 illustrates an example three dimensional image user interface in accordance with one or more embodiments of the present disclosure.

FIG. 3 illustrates an example three dimensional image user interface 330 in accordance with one or more embodiments of the present disclosure. The 3D image user interface 330 can be displayed on a display of a computing device as described herein. The 3D image user interface 330 can include a visual display of a number of features of a building. The number of features can be described in the BIM data for the building.

Each pixel and/or area of pixels within the 3D image user interface 330 that is represented within the display area 336 can stand for an object. For example, a VAV box 342 can be displayed on the 3D image user interface display area 336. In this example, a user can select the VAV box 342 and the 3D image user interface 330 can display features and information regarding the VAV box 342 within the display area 336. Each pixel can display a number of features of the building (e.g., doors, windows, cameras, diffuser 340, VAV box 342, elevator 338, etc.).

Each of the number of features of the building can be selected to display information (e.g., building state, real-time information, object information, etc.) relating to the number of features. The information can be displayed within a menu 334. The information that is displayed within the menu 334 can include BAS information (e.g., security alarm information, recent security information, reports of the BAS, etc.). The menu 334 can be utilized to alter and/or update the BAS information and/or devices of the BAS. For example, the menu 334 can be utilized to override a particular alarm system within the displayed area 336.

As described herein, a number of rules can be defined to customize the displayed area 336. The number of rules can be defined and presented within the menu 332 and can be selected to highlight a number of selected features. For example, the features of the HVAC system (e.g., VAV box 342, diffuser 340, etc.) can be selected and occlusions of the HVAC system can be removed to highlight the selected features of the HVAC system. The occlusions of the HVAC system can include the ceiling tiles of the location represented within the display area 336.

Information relating to the number of features can include real-time information that relates to the number of features. For example, real-time information can include a video feed (e.g., current security video from a security camera, etc.) for displayed security camera. In another example, real-time information can include information from a number of sensors of a system (e.g., HVAC, plumbing, electrical, etc.).

The 3D image user interface 330 can enable a user to navigate to various locations of the building that is represented by the BIM data. The user can navigate to the number of locations where virtual cameras were placed. For example, the user can utilize a menu 332 to select a particular location (e.g., level 1, level 2, etc.).

Figure 4:
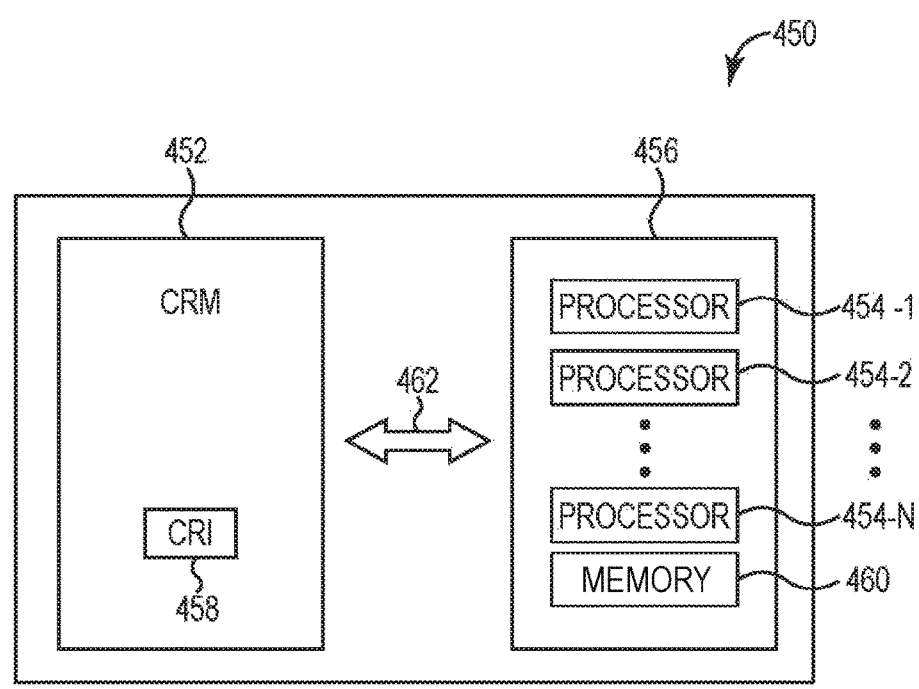
FIG. 4 illustrates a block diagram of an example of a computing device in accordance with one or more embodiments of the present disclosure.

FIG. 4 illustrates a block diagram of an example of a computing device 450 in accordance with one or more embodiments of the present disclosure. The computing device 450, as described herein, can also include a computer readable medium (CRM) 452 in communication with processing resources 454-1, 454-2, ..., 454-N. CRM 452 can be in communication with a device 456 (e.g., a Java® application server, among others) having processor resources 454-1, 454-2, ..., 454-N. The device 456 can be in communication with a tangible non-transitory CRM 452 storing a set of computer-readable instructions (CRI) 458 (e.g., modules) executable by one or more of the processor resources 454-1, 454-2, ..., 454-N, as described herein. The CRI 458 can also be stored in remote memory managed by a server and represent an installation package that can be downloaded, installed, and executed. The device 456 can include memory resources 460, and the processor resources 454-1, 454-2, ..., 454-N can be coupled to the memory resources 460.

Processor resources 454-1, 454-2, ..., 454-N can execute CRI 458 that can be stored on an internal or external non-transitory CRM 452.

The processor resources 454-1, 454-2, ..., 454-N can execute CRI 458 to perform various functions. For example, the processor resources 454-1, 454-2, ..., 454-N can execute CRI 458 to perform a number of functions. A non-transitory CRM (e.g., CRM 452), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), as well as other types of computer-readable media.

The non-transitory CRM 452 can also include distributed storage media. For example, the CRM 452 can be distributed among various locations.

The non-transitory CRM 452 can be integral, or communicatively coupled, to a computing device, in a wired and/or a wireless manner. For example, the non-transitory CRM 452 can be an internal memory, a portable memory, a portable disk, or a memory associated with another computing resource (e.g., enabling CRIs to be transferred and/or executed across a network such as the Internet).

The CRM 452 can be in communication with the processor resources 454-1, 454-2, ..., 454-N via a communication path 462. The communication path 462 can be local or remote to a machine (e.g., a computer) associated with the processor resources 454-1, 454-2, ..., 454-N. Examples of a local communication path 462 can include an electronic bus internal to a machine (e.g., a computer) where the CRM 452 is one of volatile, non-volatile, fixed, and/or removable storage medium in communication with the processor resources 454-1, 454-2, ..., 454-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 462 can be such that the CRM 452 is remote from the processor resources (e.g., 454-1, 454-2, ..., 454-N), such as in a network relationship between the CRM 452 and the processor resources (e.g., 454-1, 454-2, ..., 454-N). That is, the communication path 462 can be a network relationship. Examples of such a network relationship can include a local area network (LAN), wide area network (WAN), personal area network (PAN), and the Internet, among others. In such examples, the CRM 452 can be associated with a first computing device and the processor resources 454-1, 454-2, ..., 454-N can be associated with a second computing device (e.g., a Java® server).

As described herein, a "module" can include computer readable instructions (e.g., computer readable instructions, etc.) that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A three dimensional (3D) image generation method, comprising:
    calculating a number of locations for virtual cameras using building information modeling (BIM) data;
    placing the virtual cameras at the number of locations that include a number of objects, occlusions, and spatial area of the number of locations to provide a visual representation of the number of locations;
    capturing photos of the number of objects, the occlusions, and the spatial area of the number of locations via the virtual cameras by including a focal point and a plurality of photographic limitations using a world coordinate system;
    stitching the photos to create a sphere panorama of a surrounding area of each of the number of locations based on the world coordinate system, wherein each sphere panorama depicts a surface of a sphere surrounding each of the number of virtual cameras;
    transforming the number of objects from the world coordinate system within the BIM data to a surface sphere coordinate system of the sphere panorama that includes the number of objects, wherein surface sphere coordinates of the number of objects are coordinates of the number of objects on the sphere panorama;
    generating the 3D image at each of the number of locations by transforming the number of objects from the surface sphere coordinate system to an image coordinate system based on first positions of the surface sphere coordinates of the number of objects relative to the north pole of the sphere panorama, wherein second positions of image coordinates of the number of objects relative to a top border of the generated 3D image is determined by the first positions of the surface sphere coordinates of the number of objects relative to the north pole of the sphere panorama; and
    generating a 3D user interface utilizing the 3D image generated at each of the number of locations.

2. The method of claim 1, wherein calculating the number of locations includes determining a number of the occlusions within the number of locations.

3. The method of claim 1, further comprising implementing object information for each pixel of the sphere panorama and implementing real-time object information for areas of pixels that represent the number of objects.

4. The method of claim 1, wherein capturing the photos includes generating a 3D panorama image that includes panning and tilting with the virtual camera to capture the photos surrounding the locations of the virtual camera.

5. The method of claim 1, wherein generating the 3D user interface includes displaying object information by selecting a pixel of a first object of the number of objects on the 3D user interface.

6. The method of claim 1, wherein generating the 3D user interface includes navigating through the spatial area of the number of locations by switching between the number of locations and viewing the sphere panorama of a particular location.

7. A non-transitory computer readable medium comprising instructions that, when executed by a computing device, causes the computing device to:
    calculate a number of locations for virtual cameras using building information modeling (BIM) data of the number of locations;
    place the virtual cameras at the number of locations that include a number of objects, occlusions, and spatial area of the number of locations to provide a visual representation of the number of locations;
    capture photos of the number of objects, the occlusions, and the spatial area of the number of locations via the virtual cameras by including a focal point and a plurality of photographic limitations using a world coordinate system;
    stitch the photos to create a sphere panorama at each of the number of locations of a surrounding area of the number of locations based on the world coordinate system, wherein each sphere panorama depicts a surface of a sphere surrounding each of the number of virtual cameras;
    transform the number of objects from the world coordinate system within the BIM data to a surface sphere coordinate system of the sphere panorama that includes the number of objects, wherein surface sphere coordinates of the number of objects are coordinates of the number of objects on the sphere panorama;
    generate a three dimensional (3D) image at each of the number of locations by transforming the number of objects from the surface sphere coordinate system to an image coordinate system based on first positions of the surface sphere coordinates of the number of objects relative to the south pole of the sphere panorama, wherein second positions of image coordinates of the number of objects relative to a bottom border of the generated 3D image is determined by the first positions of the surface sphere coordinates of the number of objects relative to the south pole of the sphere panorama;
    determine a number of rules for the virtual cameras; and
    generate a 3D user interface utilizing the 3D image generated at each of the number of locations based on coordinate information that is transformed into a number of sphere coordinates around the virtual cameras utilizing the number of rules.

8. The medium of claim 7, wherein the 3D user interface is changed from a first location of the number of locations to a second location of the number of locations.

9. The medium of claim 7, wherein object information is embedded into each pixel of the photos, wherein the object information includes information relating to a building automation system (BAS) object information.

10. The medium of claim 9, further comprising instructions to cause the computing device to access the BAS object information and to update the BAS object information.

11. The medium of claim 7, further comprising instructions to cause the computing device to pan and tilt a number of the virtual cameras, and take the photos within each of the number of locations and generate the 3D user interface based on the photos.

12. A system, comprising:
   a computing device;
   a memory storing instructions, wherein the instructions when executed by the computing device cause the computing device to:
      calculate a number of locations for virtual cameras using building information modeling (BIM) data of each of the number of locations;
      place the virtual cameras at the number of locations via a user interface of the computing device, wherein the number of locations include a number of objects, occlusions, and spatial area to provide a visual representation of the number of locations;
      capture photos of the number of objects, the occlusions, and the spatial area of the number of locations via the virtual cameras that represent images of a real photographic camera by including a focal point and a plurality of photographic limitations using a world coordinate system;
      stitch the photos to create a sphere panorama at each of the number of locations of a surrounding area of each of the number of locations based on the world coordinate system, wherein each sphere panorama depicts a surface of a sphere surrounding each of the number of virtual cameras;
      transform the number of objects from the world coordinate system within the BIM data to a surface sphere coordinate system of the sphere panorama that includes the number of objects, wherein surface sphere coordinates of the number of objects are coordinates of the number of objects on the sphere panorama;
      generate a three dimensional (3D) image at each of the number of locations by transforming the number of objects from the surface sphere coordinate system to an image coordinate system based on a longitude line of the sphere panorama containing the surface sphere coordinates of the number of objects, wherein the longitude line of the sphere panorama indicates a relative surface sphere coordinate location compared to a right border of the generated 3D image or a left border of the generated 3D image, and wherein each object of the number of objects is determined to be closer to the right border of the generated 3D image or closer to the left border of the generated 3D image using the longitude line of the sphere; and
      generate a 3D user interface utilizing the 3D image generated at each of the number of locations.

13. The system of claim 12, wherein generating the 3D user interface includes panning and tilting with the virtual cameras to capture the photos of the number of locations.

14. The system of claim 13, wherein panning and tilting with each virtual camera captures the photos 360 degrees surrounding the virtual camera.

15. The system of claim 12, wherein the 3D user interface displays each of the number of locations.

16. The system of claim 15, wherein the 3D user interface includes navigation features to display each of the number of locations as a single 3D representation.

* * * * *